United States Patent [19]

Doleh

[11] Patent Number: 5,325,655
[45] Date of Patent: Jul. 5, 1994

[54] METHOD OF PROCESSING GARBAGE, PARTICULARLY PLASTIC

[76] Inventor: Zakaria K. Doleh, P.O. Box 7364, Dubai, United Arab Emirates

[21] Appl. No.: 932,811

[22] Filed: Aug. 19, 1992

[30] Foreign Application Priority Data

Aug. 23, 1991 [EP] European Pat. Off. ......... 91202162.3

[51] Int. Cl.$^5$ .................... B65B 1/24; B65B 11/30; B65B 61/00
[52] U.S. Cl. ........................... 53/436; 53/461; 53/527
[58] Field of Search ............... 53/438, 436, 439, 526, 53/528, 529, 523, 527, 461

[56] References Cited

U.S. PATENT DOCUMENTS

| | | | |
|---|---|---|---|
| 3,330,088 | 7/1967 | Dunlea, Jr. | 53/438 X |
| 3,451,190 | 6/1969 | Tezuka | 53/529 |
| 3,604,179 | 9/1971 | Lund | 53/438 X |
| 3,654,048 | 4/1972 | Bathgate | 53/438 X |
| 4,040,230 | 8/1977 | Pessel et al. | 53/438 |
| 4,346,653 | 8/1982 | Rodak | 100/37 |
| 4,559,870 | 12/1985 | Krummacher et al. | 53/436 X |

FOREIGN PATENT DOCUMENTS

| | | |
|---|---|---|
| 893120 | 8/1982 | Belgium . |
| 0130178 | 1/1985 | European Pat. Off. . |
| 1529580 | 6/1968 | France . |
| 1074230 | 7/1967 | United Kingdom . |

OTHER PUBLICATIONS

Copy of European Search Report for European Patent Application No. 91202162.3.

Primary Examiner—James F. Coan
Attorney, Agent, or Firm—Webb, Ziesenheim Bruening Logsdon Orkin & Hanson

[57] ABSTRACT

Garbage is processed by separating the garbage in fractions, compressing the fractions in a container according to a desired predetermined composition, placing the container in a casing of metal wire, and placing the container on a destination place, preferably on the sea bottom. By means of the tidal influence after a certain time period sea weed, barnacles and so on will adhere to the metal wire and embed the container in a natural way protecting the environment from the garbage.

20 Claims, 5 Drawing Sheets

METHOD OF PROCESSING GARBAGE, PARTICULARLY PLASTIC

The invention is related to a method for processing garbage, especially plastic.

Garbage processing is a serious problem. As is generally known, garbage consists of different fractions, some of which are biologically decomposable but other fractions are not. Plastic, for example, is hazardous, as it does not decompose. Garbage is usually dumped on predetermined locations and separated from the environment as much as possible. However, this is not a suitable solution.

It is the object of the invention to process garbage, more particularly plastic, in a way that is not deterious to the environment and to make an efficient use of it.

According to the invention, this is achieved by means of a method comprising the consecutive method steps:
separating the garbage in fractions,
compressing the fractions in a container according to a desired predetermined composition,
placing the container in a casing consisting of a web of metal wire coated with plastic, and
placing the container on a destination place.

From GB-A-1,074,230 a method for processing garbage is known, according to which a garbage is compressed into a container and thereafter the container is disposed in for example the sea. It is suggested to puncture the container in order to preclude any possibility of the container to remain afloat. This means that the garbage is not separated from the environment.

By confining garbage in containers, the garbage is separated from the environment. Preferably the containers are placed into the sea, for example close to the cotidal line. The containers are to be filled with plastic, but also with more heavier material, as otherwise the container will float rather than sink. In the sea barnacles, sea weed etc. adhere to the web of metal wire coated with plastic. After some time period the container is fully embedded in the natural growth or fouling so that also on the long term a separation with respect to the environment is obtained in a natural way.

The method can be applied for several practical purposes. It is possible to use bundles of containers as wave breakers or for land upgrading or reclaiming. The containers can be placed for example in spaces confined by piles which are driven into the sea bottom. After some time, a compact filled space is created, which can be considered as land upgraded and reclaimed from the sea. The space can be covered by sheets of plastic, for example polyethylene. On this upgraded level and reclaimed area a road surface can be applied by cutting or shredding the plastic in particular and other suitable materials to small pieces and adding it to the asphalt mixture for building roads (for paving purposes).

The container can have various shapes, for example cylindrical or in the shape of a rhomboid.

The invention will be elucidated with the help of the drawings.

Figure 1:
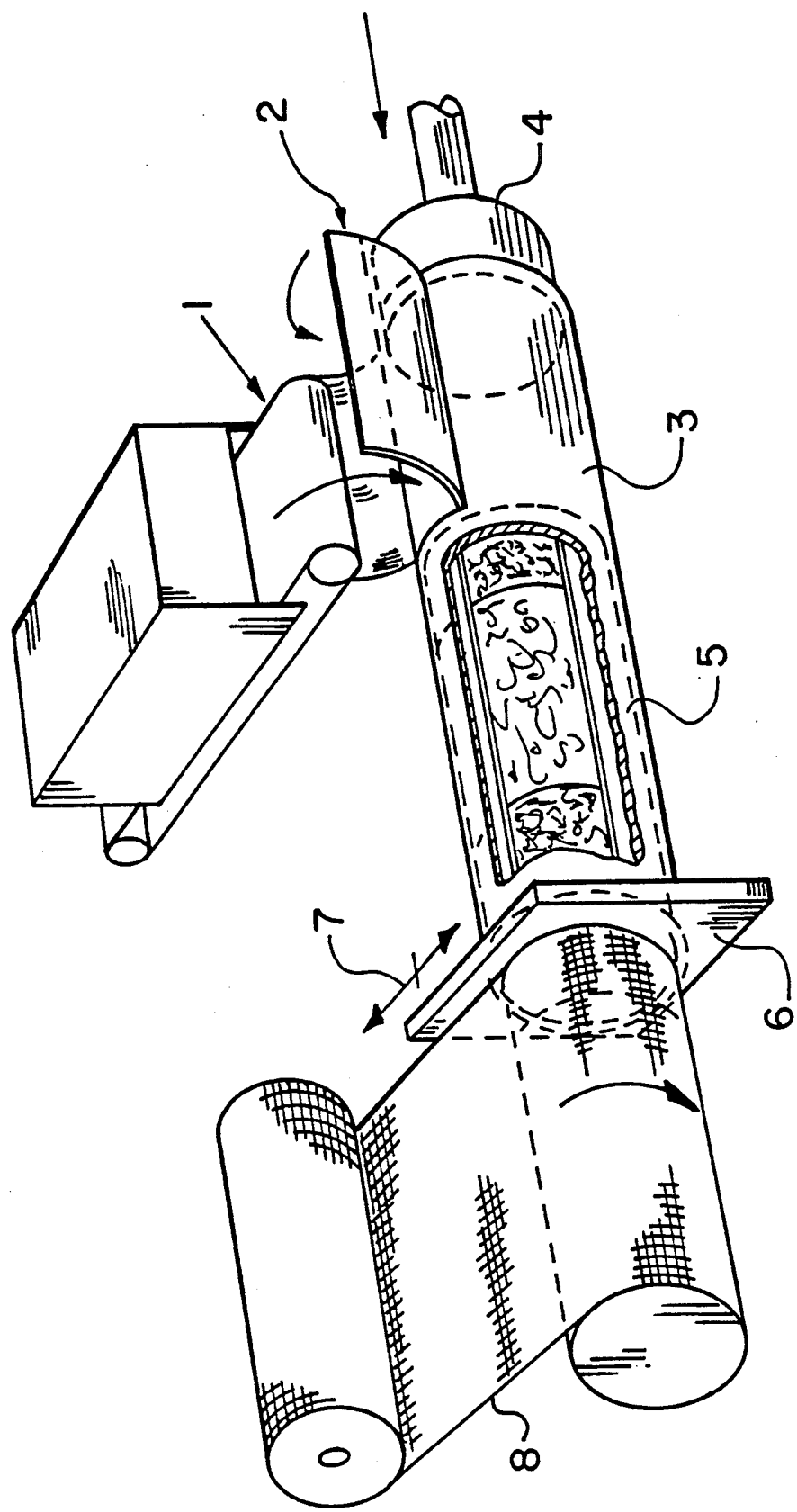
FIG. 1 shows diagrammatically the way garbage is compressed in a container.
Figure 2:
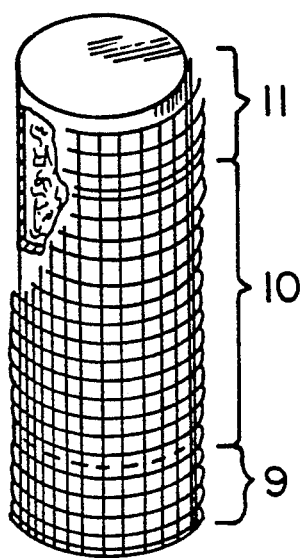
FIGS. 2 and 3 show various shapes of the containers.
Figure 4:
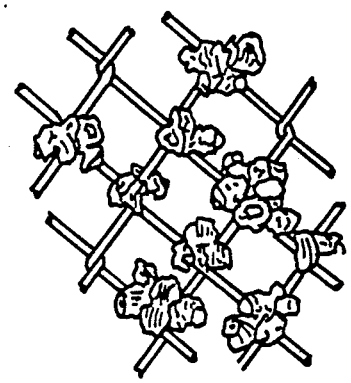
FIG. 4 shows the way of growth, for example barnacles on the metal wires.
Figure 3:
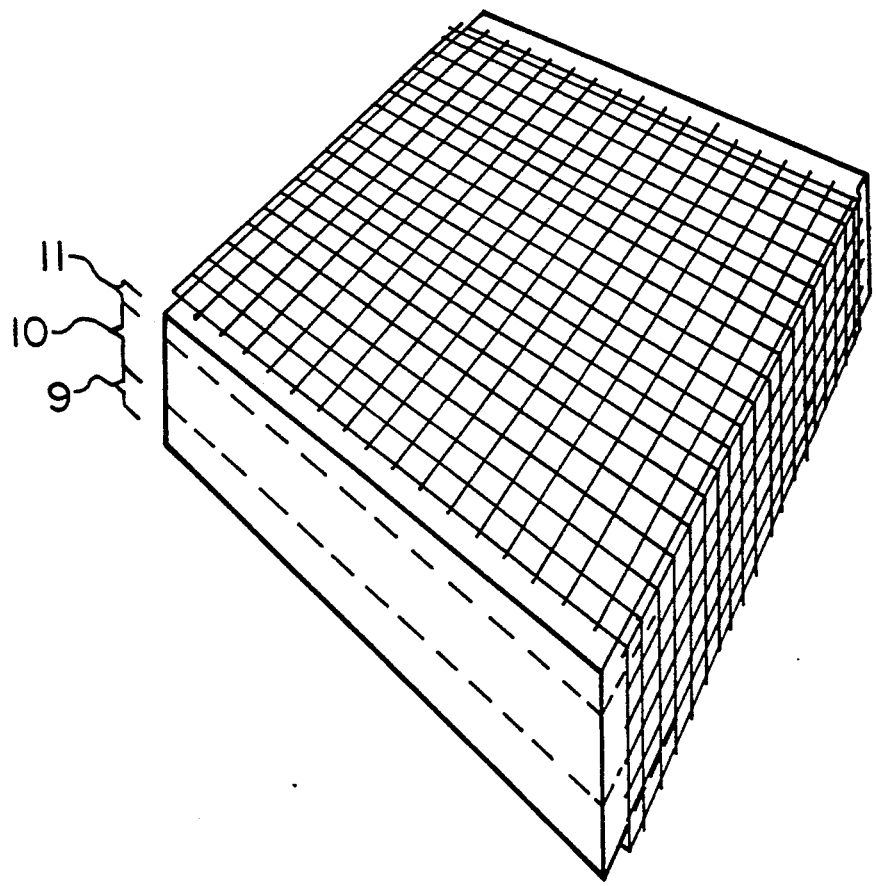

By means of a conveyor 1 fractions of garbage, for example plastic, metal and other garbage is conveyed to a cylindrical receiving member 2, that is moved to the compressing device 3 after filling. In the compressing device 3 garbage in a cylindrical container 5 is compressed by means of a piston 4. The container is closed off by means of a shutter 6 at the end opposite of the piston 4. The shutter 6 is reciprocally movable in the direction of the arrow 7. After filling of the container 5 the shutter 6 is moved to an open position whereupon the filled container is moved in longitudinal direction, rotated and wrapped in a web of metal wire 8 coated with plastic. In this way the cylindrical container according to FIG. 2 is obtained. The lower part 9 of the container according to FIG. 2 can be filled with heavy metals, the medium part 10 can be filled with plastic and the upper part 11 can be filled with other garbage. FIG. 3 is an alternative embodiment of the container. This type of container can be used as desert tracks. FIG. 4 shows that after some time period, if the container is placed into the sea, by means of growth, as known from foulings on a hull of a ship, is embedded.

Figure 5:
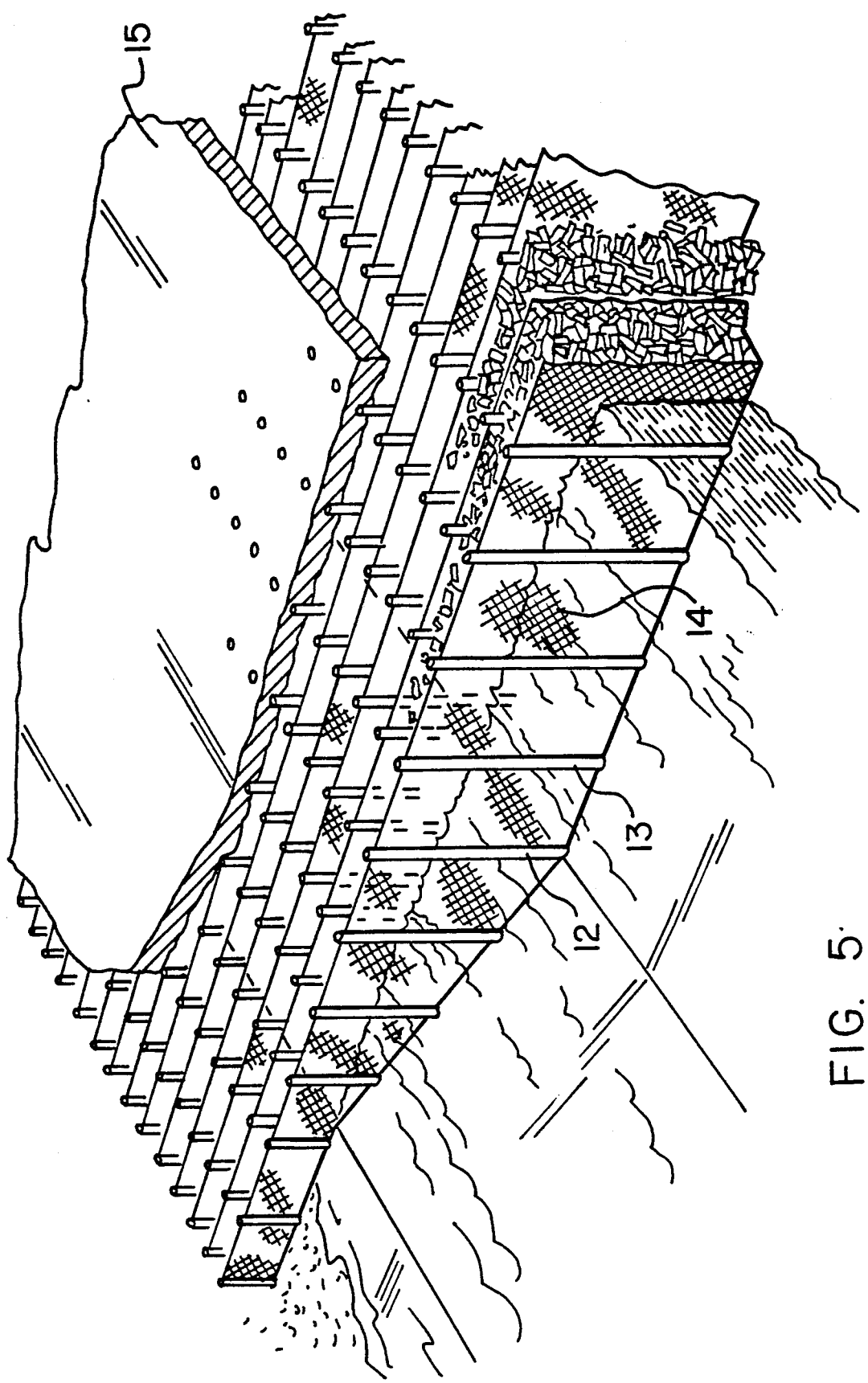
FIG. 5 shows an example of placing the containers between spaces confined by piles driven in the sea bottom to upgrade and reclaim land of the sea.

According to FIG. 5 a space confined by piles, for example 12, 13 is formed, whereby in between the piles a web 14 of metal wire coated with plastic can be applied. In this space containers with garbage can be placed. After some time, by means of growth, barnacles and so on a fully closed compact mass will be obtained which is separated from the sea environment in a natural way. In this way the invention can be implemented to upgrade and reclaim land from the sea.

On the upgraded and reclaimed land a covering layer 15 can be applied, which can serve as road surface by cutting or shredding the plastic in particular and other suitable materials to small pieces and adding it to the asphalt mixture for building roads (for paving purposes) as well as fundament for buildings.

Figure 6:
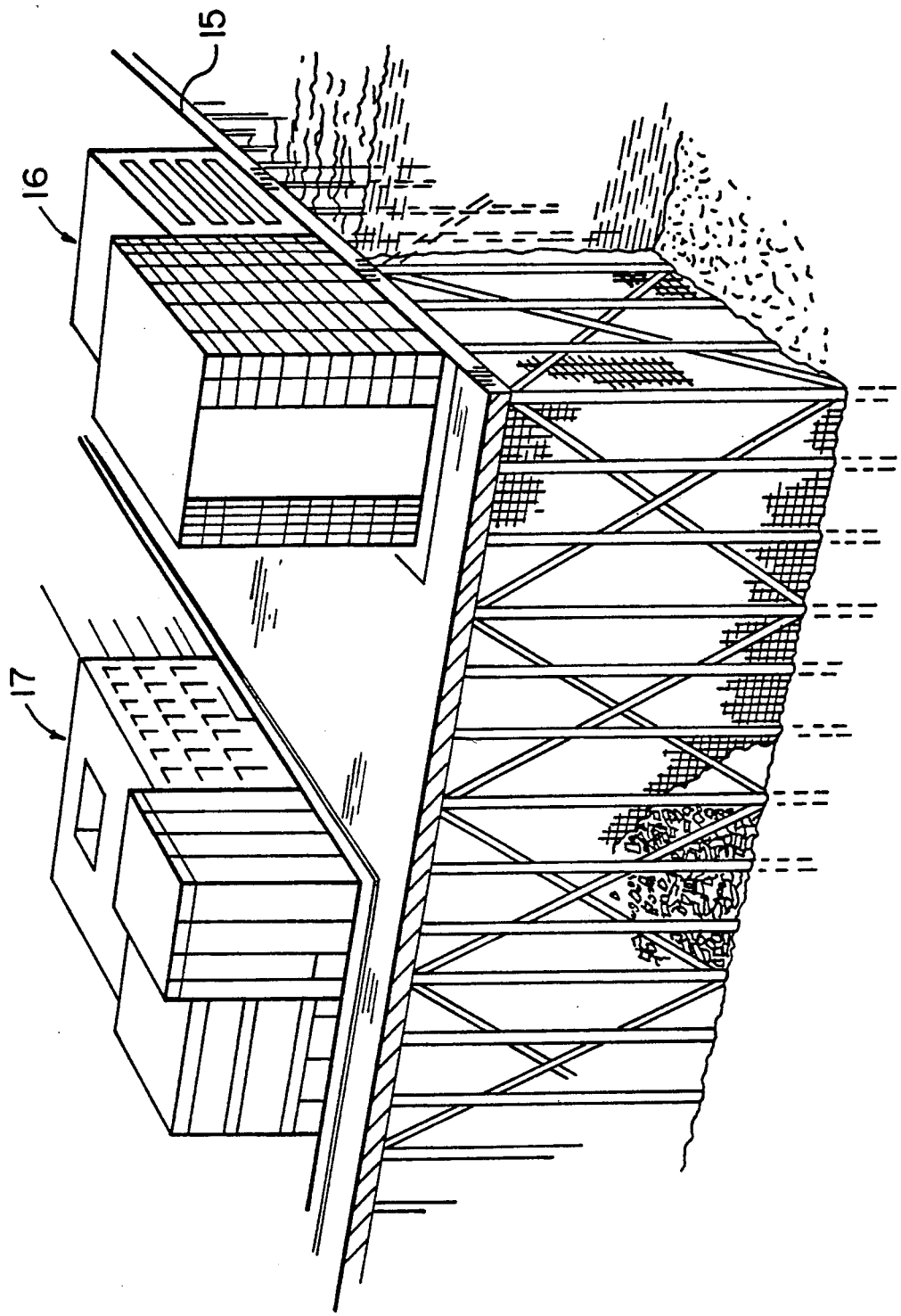
FIG. 6 shows an example of the implementation of the invention for existing constructions, and, FIG. 7 is another embodiment of the invention.

Fig. 6 shows the way in which the invention can be implemented to improve the fundament of existing buildings. Underneath the buildings, being based upon piles, containers with garbage can be placed to fill the space between piles, that is left by virtue of lowering of bottom locally, such as in coastal areas.

Figure 7:
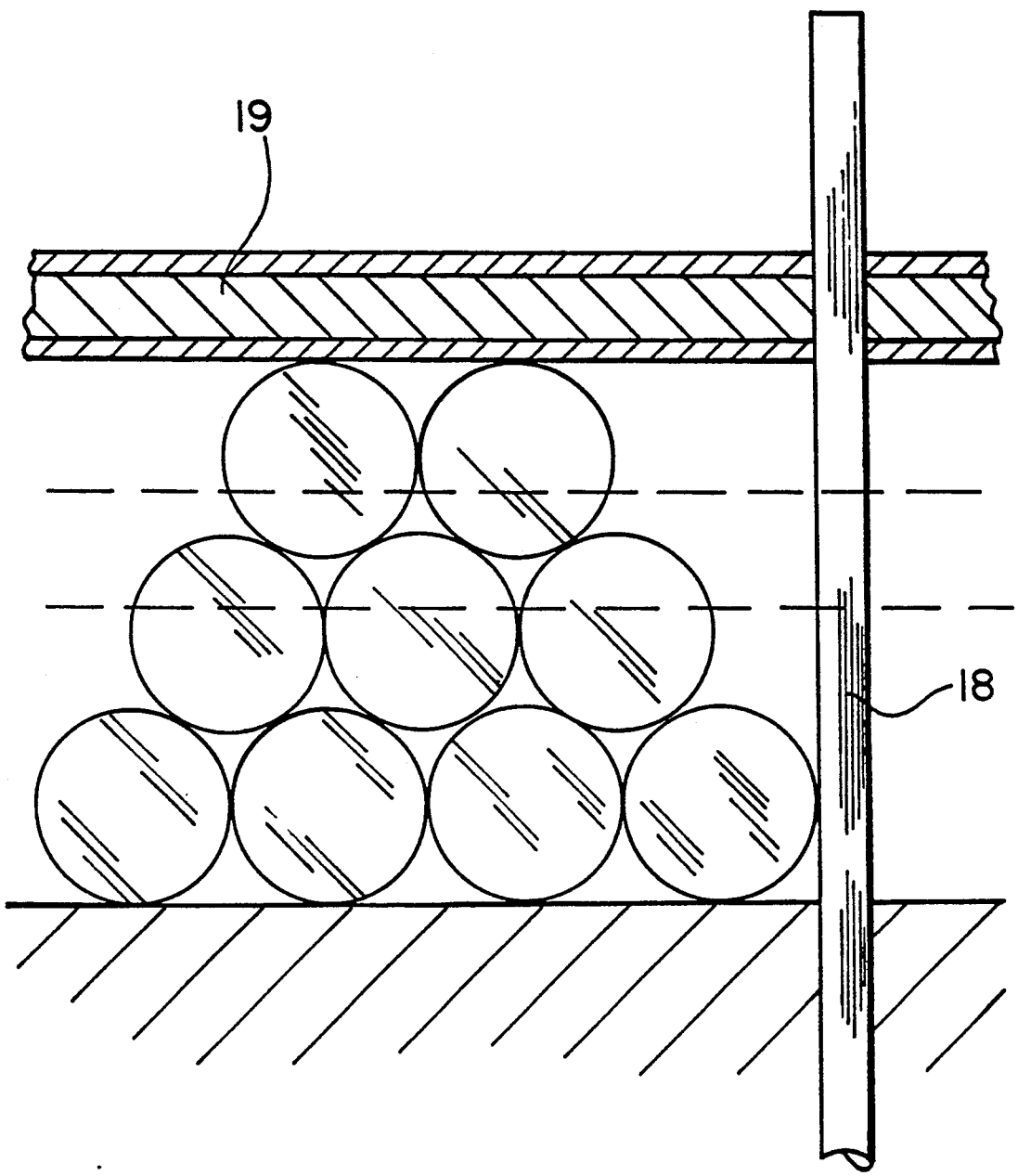

FIG. 7 show how the containers are stacked on the sea bottom. The containers are positioned in between piles. When the containers are fully embedded by barnacles and sea weed a compact solid mass will be obtained, that can be covered by fillings 19 for roads and gardens. Another possibility is to use the space in between the containers or growing of fish.

I claim:

1. A method for processing garbage comprising the consecutive method steps:
   A. separating the garbage in fractions;
   B. compressing the fractions in a container according to a desired predetermined composition;
   C. placing the container in a casing consisting of a web of metal wire coated with plastic; and
   D. placing the container on a destination place.

2. A method according to claim 1, wherein the destination place is a sea.

3. A method according to claim 1, wherein the destination place is desert land.

4. A method according to claim 1, wherein the garbage is separated in plastic, metals and further garbage.

5. A method according to claim 1, wherein the container is cylindrical.

6. A method according to claim 1, wherein the container includes apertures for water.

7. A method according to claim 1, wherein the container is placed in a space defined by piles arranged in sea bottom.

8. A method according to claim 7, wherein the space is covered by sheets of plastic.

9. A method according to claim 7, wherein the space is covered at an upper side by a road surface by cutting or shredding the plastic and other suitable materials into small pieces and adding it to an asphalt mixture for building roads.

10. A method according to claim 1, wherein the container has the shape of a rhomboid.

11. A method according to claim 2, wherein the container is placed in a space defined by piles arranged in a sea bottom.

12. A method according to claim 11, wherein the space is covered by sheets of plastic.

13. A method according to claim 8, wherein the plastic is polyethylene.

14. A method according to claim 12, wherein the plastic is polyethylene.

15. A method according to claim 8, wherein the space is covered at an upper side by a road surface by cutting or shredding the plastic and other suitable materials into small pieces and adding it to an asphalt mixture for building roads.

16. A method according to claim 3, wherein the container has the shape of a rhomboid.

17. A method according to claim 2, wherein the container is cylindrical.

18. A method according to claim 13, wherein the space is covered at an upper side by a road surface by cutting or shredding the plastic and other suitable materials into small pieces and adding it to an asphalt mixture for building roads.

19. A method for processing garbage comprising the consecutive method steps:
   A. separating the garbage in fractions;
   B. compressing the fractions in a container according to a desired predetermined composition;
   C. placing the container in a casing consisting of a web of metal wire coated with plastic; and
   D. placing the container on a destination place wherein the destination place is a sea, wherein the container is placed in a space defined by piles arranged in a sea bottom and the space is covered by sheets of plastic; and wherein the space is covered at an upper side by a road surface by cutting or shredding the plastic and other suitable materials into small pieces and adding it to an asphalt mixture for building roads.

20. A method for processing garbage comprising the consecutive method steps:
   A. separating the garbage in fractions;
   B. compressing the fractions in a container according to a desired predetermined composition;
   C. placing the container in a casing consisting of a web of metal wire coated with plastic; and
   D. placing the container on a destination place wherein the destination place is a sea and wherein the container is placed in a space defined by piles arranged in a sea bottom wherein the space is covered at an upper side by a road surface by cutting or shredding the plastic and other suitable materials into small pieces and adding it to an asphalt mixture for building roads.

* * * * *